United States Patent
Isurin et al.

(10) Patent No.: US 7,379,309 B2
(45) Date of Patent: May 27, 2008

(54) HIGH-FREQUENCY DC-DC CONVERTER CONTROL

(75) Inventors: Alexander Isurin, Dublin, OH (US); Alexander Cook, Dublin, OH (US)

(73) Assignee: Vanner, Inc., Hilliard, OH (US)

( * ) Notice: Subject to any disclaimer, the term of this patent is extended or adjusted under 35 U.S.C. 154(b) by 411 days.

(21) Appl. No.: 11/035,839

(22) Filed: Jan. 14, 2005

(65) Prior Publication Data

US 2005/0152159 A1    Jul. 14, 2005

Related U.S. Application Data

(60) Provisional application No. 60/536,328, filed on Jan. 14, 2004.

(51) Int. Cl.
*H02M 3/335* (2006.01)
*H02M 3/24* (2006.01)

(52) U.S. Cl. .......................... 363/17; 363/98

(58) Field of Classification Search ................ 363/16, 363/17, 21.02, 21.03, 24–26, 49, 97, 98, 363/132–134
See application file for complete search history.

(56) References Cited

U.S. PATENT DOCUMENTS

| 4,317,165 | A | | 2/1982 | Sullivan |
|---|---|---|---|---|
| 4,855,888 | A | | 8/1989 | Henze et al. |
| 4,975,823 | A | * | 12/1990 | Rilly et al. .................... 363/97 |
| 5,157,593 | A | | 10/1992 | Jain |
| 5,325,283 | A | * | 6/1994 | Farrington et al. ......... 363/132 |
| 5,373,196 | A | | 12/1994 | Faley |
| 5,452,197 | A | | 9/1995 | Rice |
| 5,539,630 | A | * | 7/1996 | Pietkiewicz et al. .......... 363/17 |
| 5,777,864 | A | | 7/1998 | Seong et al. |
| 6,154,375 | A | | 11/2000 | Majid et al. |
| 6,483,731 | B1 | | 11/2002 | Isurin et al. |

OTHER PUBLICATIONS

A. Isurin, A.Cook, A Novel Resonant Converter Topology and its Application, IEEE Power Electronics Specialists Conference, PESC 2001, vol. 2, pp. 1039-1044, Vancouver, BC, Canada, Jun. 2001.
R. Oruganti, P.C. Heng, J.T.K. Guan, L. A. Choy, Soft-Switched DC/DC Converter with PWM Control, IEEE Transactions on Power Electronics, vol. 13, No. 1, Jan. 1998, pp. 102-113.
G. S. N. Raju, S. Doralda, An LCL Resonant Converter with PWM Control-Analysis, Simulation, and Implementation, IEEE Transactions on Power Electronics, vol. 10, No. 2, Mar. 1995, pp. 164-173.

(Continued)

*Primary Examiner*—Jessica Han
(74) *Attorney, Agent, or Firm*—James R. Eley; Michael A. Forhan; Eley Law Firm Co.

(57) ABSTRACT

A high-frequency DC-DC converter. The high-frequency DC-DC converter comprises a resonant power stage and a controller to operate the resonant power stage. The resonant power stage is controlled by the controller with at least one of a variable frequency mode and a pulse width modulation mode to convert an input DC voltage to one of a higher output DC voltage and a lower output DC voltage.

20 Claims, 7 Drawing Sheets

OTHER PUBLICATIONS

H. Li, F.Z. Peng, J. Lawler, Modeling, Simulation, and Experimental Verification of Soft-Switched Bi-Directional DC-DC Converters, IEEE Applied Power Electronics Conference and Exposition, APEC 2001, vol. 2, pp. 736-744, Anaheim, CA, Mar. 2001, no month.

N.H. Li, F.Z. Peng, J.S. Lawer, A Natural ZVS Medium-Power Bidirectional DC-DC Converter With Minimum Number of Devices, IEEE Transactions on Industry Applications, vol. 39, No. 2, Mar./Apr. 2003, pp. 525-535.

O. Q. Zhao, Fred C. Lee, High-Efficiency, High Step-Up DC-DC Converters, IEEE Transactions on Power Electronics, vol. 18, No. 1, Jan. 2003, pp. 65-73.

M. Ishida, H. Fujino, T. Hori, Real-Time Output Voltage Control Method of Quasi-ZCS Series Resonant HF-Linked DC-AC Converter, IEEE Transactions on Power Electronics, vol. 10, No. 6, Nov. 1995, pp. 776-783.

G. C. Hsieh, C. H. Lin, J. M. Li, Y. C. Hsu, A Study of Series-Resonant DC/AC Inverter, IEEE Transactions on Power Electronics, vol. 11, No. 4, Jul. 1996, pp. 641-652.

I. Batarseh, Resonant Converter Topologies with Three and Four Energy Storage Elements, IEEE Transactions on Power Electronics, vol. 9, No. 1, Jan. 1994, pp. 64-73.

J. L. Lin, J. S. Lew, Robust Controller Design for a Series Resonant Converter Via Duty-Cycle Control, IEEE Transactions on Power Electronics, vol. 14, No. 5, Sep. 1999, pp. 793-801.

\* cited by examiner $t_2$-$t_3$ and $t_5$-$t_6$

At first pulse

| EXAMPLE 1 | | | | EXAMPLE 2 | | | |
|---|---|---|---|---|---|---|---|
| Vin | Vout | Pout W | Efficiency | Vin | Vout | Pout W | Efficiency |
| 10.5 | 400 | 2,200 | 90% | 41.5 | 400 | 4500 | 95.60% |
| 11.5 | 400 | 1,500 | 94.0% | 42.2 | 400 | 6,000 | 93.7% |
| 11.8 | 400 | 2,200 | 92.5% | 48.0 | 400 | 1,800 | 97.0% |
| 12.5 | 400 | 400 | 97.0% | 59.0 | 400 | 4,500 | 93.5% |
| 16.0 | 400 | 1,200 | 92.0% | 61.4 | 400 | 6,100 | 93.8% |
| 16.0 | 400 | 2,200 | 91.5% | 80.0 | 400 | 6,000 | 93.5% |
| 18.0 | 400 | 2,200 | 91.5% | | | | |
| Idle power loss 2 watts | | | | Idle power loss 4W | | | |

HIGH-FREQUENCY DC-DC CONVERTER CONTROL

This application claims priority to U.S. provisional application 60/536,328, filed Jan. 14, 2004, the contents of which are hereby incorporated by reference.

FIELD

The present invention relates generally to DC-DC converters. In particular, the present invention relates to a high-frequency DC-DC converter control.

BACKGROUND

Voltage conversion utilizing a high step-up ratio, such as on the order of 20:1 or greater and having output power levels greater than one kilowatt can be accomplished by many present methods in the art. However, these methods either suffer from a relatively low efficiency, on the order of about 85%, or require relatively complex circuitry that results in a correspondingly high cost. In addition, the step-up commutation frequency for power levels above about one kilowatt does not typically exceed 50 kHz due to component limitations. When faced with the task of designing a relatively low-cost, high-efficiency, isolated step-up DC-DC converter with demanding specifications, such as an output power of about 2 kilowatts with an input voltage of about 8-16 volts DC and an output voltage of about 400 volts DC with voltage and current control to be done over a range of no-load to full-load, present voltage conversion methods become even less feasible.

In particular, when the commutation current is relatively high, such as on the order of 250 amperes, it is difficult to suppress current and/or voltage spikes, driving a need to decrease the commutation frequency. This results in an increase in the physical size of associated magnetic components and, consequently, increased cost. This shortcoming can be partially mitigated with zero current switching ("ZCS") available in the art for use in high-current circuits, as well as using variable frequency regulation. However, ZCS introduces another problem because when the input voltage is at a maximum the current stress on switching semiconductors and the peak flux density in step-up transformers are both increased. This, in turn, drives a need for an increased number of semiconductors and a physically larger step-up transformer to achieve acceptable converter reliability. This results in a decrease in voltage conversion efficiency and a corresponding increase in the cost of voltage conversion. Moreover, voltage conversion techniques presently available in the art are prone to significant electromagnetic interference ("EMI") emissions, making such techniques incompatible with many applications that are sensitive to EMI, such as radio frequency ("RF") receiving equipment.

There is a need for a physically small voltage step-up converter that is both highly efficient and cost effective as compared to techniques available in the present art, and which does not generate substantial EMI emissions.

SUMMARY

The present invention discloses a DC-DC conversion topology comprising an isolated step-up resonant converter with no energy re-circulation, wherein output voltage and/or current control is accomplished in a secondary portion of the converter by means of pulse width modulation ("PWM"). Voltage converter control may additionally be accomplished by varying the commutation frequency of voltage converter switching elements. As a result, voltage conversion is accomplished with higher efficiency and lower cost and with reduced physical size and fewer EMI emissions as compared to voltage converters available in the art.

One aspect of the present invention is a high-frequency DC-DC converter. The high-frequency DC-DC converter comprises a resonant power stage and a controller to operate the resonant power stage. The resonant power stage is controlled by the controller with at least one of a variable frequency mode and a pulse width modulation mode to convert an input DC voltage to one of a higher output DC voltage and a lower output DC voltage.

Another aspect of the present invention is a high-frequency DC-DC converter. The DC-DC converter comprises a resonant power stage including a primary portion comprising four electronic switches arranged as a full-bridge switching converter and a secondary portion comprising four diodes arranged as a full-wave rectifier. The DC-DC converter also includes a controller to operate the resonant power stage. The resonant power stage is controlled by the controller with at least one of a variable frequency mode and a pulse width modulation mode to convert an input DC voltage to one of a higher output DC voltage and a lower output DC voltage.

Yet another aspect is a method for converting low-voltage DC to high-voltage DC. The method comprises the steps of operating a power stage in resonance and controlling the power stage in at least one of a variable frequency mode and a pulse width modulation mode to convert an input DC voltage to one of a higher output DC voltage and a lower output DC voltage.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
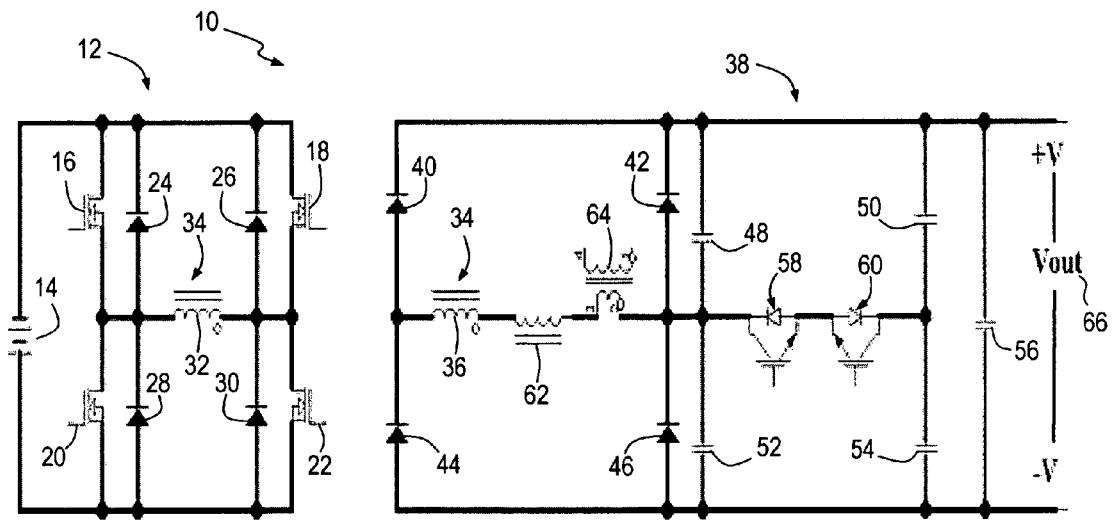
FIG. 1 is a schematic diagram of a DC-DC converter according to an embodiment of the present invention utilizing a full-bridge switching converter.

In the discussion that follows and in the accompanying figures, like reference numerals are used to indicate components having substantially the same structure or function.

A voltage converter power stage 10 according to an embodiment of the present invention is depicted in FIG. 1. Power stage 10 implements a combination of two methods of control, namely variable commutation frequency and PWM. A primary portion 12 of power stage 10 includes a DC voltage source 14 and a switching converter arrangement comprising four electronic switches, 16, 18, 20, 22 operable as any of a half-bridge, full-bridge or push-pull switching converter. Switches 16-22 may each be any conventional type of electronic switch including, without limitation, field effect transistors, bipolar transistors and solid state relays. A free-wheeling diode 24, 26, 28, 30 is connected in parallel with each of switches 16, 18, 20, 22 respectively to provide current conduction when an associated switch is off. Switches 16-22 and diodes 24-30 function as a full-bridge switching converter to cause an AC current to flow in a primary winding 32 of a step-up transformer 34.

Magnetic flux generated in primary winding 32 is inductively coupled to a secondary winding 36 of transformer 34 in a secondary portion 38 of power stage 10. A group of rectifiers 40, 42, 44, 46 function as a full-wave rectifier to convert the induced AC current of secondary winding 36 to a DC current and voltage. Capacitors 48, 50, 52 and 54 are part of a resonant circuit, discussed in more detail below. Capacitor 56 filters the DC voltage. A first and a second electronic switch, 58, 60 respectively, function as mode-control switches, as discussed more fully below.

Figure 2:
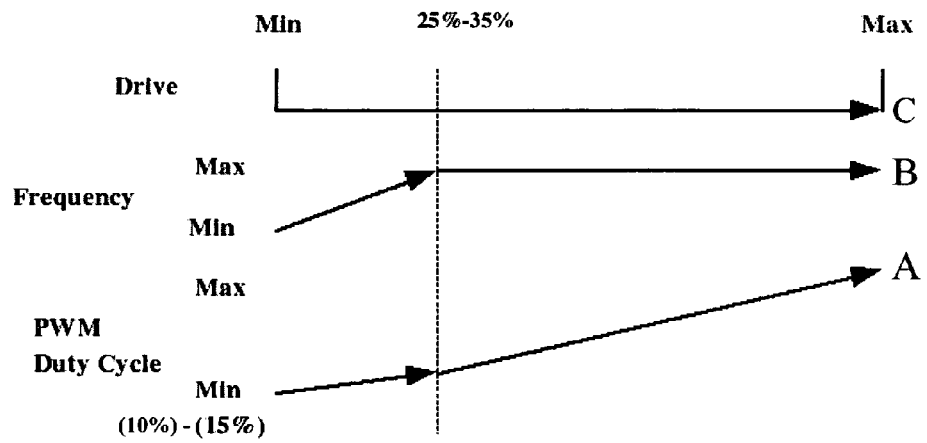
FIG. 2 depicts a plot of pulse width modulation and variable commutation frequency for a given drive level.

FIG. 2 represents one of the possible variants of how the PWM and commutation frequency of primary portion 12 (FIG. 1) may be varied for a given drive level of power stage 10. When power stage 10 staffs it follows a ramp-up of PWM duty cycle and commutation frequency, depicted as graph lines "A" and "B" respectively in FIG. 2. As shown in FIG. 2, when the drive changes from idle to about 25-30%, as indicated by graph line "C," control is primarily accomplished by varying the commutation frequency, graph line "B." In this case, a low PWM duty cycle (graph line "A") minimizes the current stress on power components such as switches 16-22 and diodes 24-30 at a maximum input voltage, which results in higher voltage conversion efficiency for power stage 10. This method of voltage converter power stage 10 control provides high stability under light loading and low energy consumption at idle, on the order of 2-4 watts, which is particularly import ant when the power stage is operated from a battery voltage source 14. As shown in FIG. 2, power stage 10 transitions through variable frequency mode (graph line "B" of FIG. 2) to achieve a "soft staff" for the unit to minimize stress on components in the power stage. FIG. 2 also shows that the commutation frequency and the duty cycle are both varied in response to the amount of load connected to an output of the converter when the power delivered to the load is less than a predetermined threshold level (equating to about 25-35% drive level in this example), and that the commutation frequency is substantially fixed and the duty cycle is varied in response to the amount of load when the power delivered to the load is greater than the predetermined threshold level.

When the commutation frequency of converter power stage 10' reaches a maximum, such as about 100 kHz or more, control continues by PWM in secondary portion 38. Secondary portion 38 may function in one of two operating modes. A first operating mode is a unidirectional resonant converter comprising an inductor 62 and capacitors 48, 50, 52, 54, with no energy recirculation, and having voltage-doubling rectification provided by diodes 40, 44. Diodes 42 and 46 function as voltage clamps to suppress voltage spikes. A second operating mode is a bidirectional resonant converter that provides discharge of the resonant converter, comprising inductor 62 and capacitors 48, 50, 52, 54, into a load connected to an output 66 of secondary portion 38. The active components switching between the first and second operating modes are switches 58 and 60, functioning as zero voltage switches ("ZVS.") The other switching components (e.g., switches 16-22 and diodes 24-30) function as both ZCS and ZVS. The combination of the two control methods, i.e. varying both the commutation frequency and PWM, allows converter power stage 10 to operate with high efficiency. Full control of the power delivered at output 66 is possible, with a stable output voltage and high stability, and with a rapid response to changes in load (e.g., from no-load to full-load and vice versa), while the input voltage 14 can vary twofold.

Figure 3:
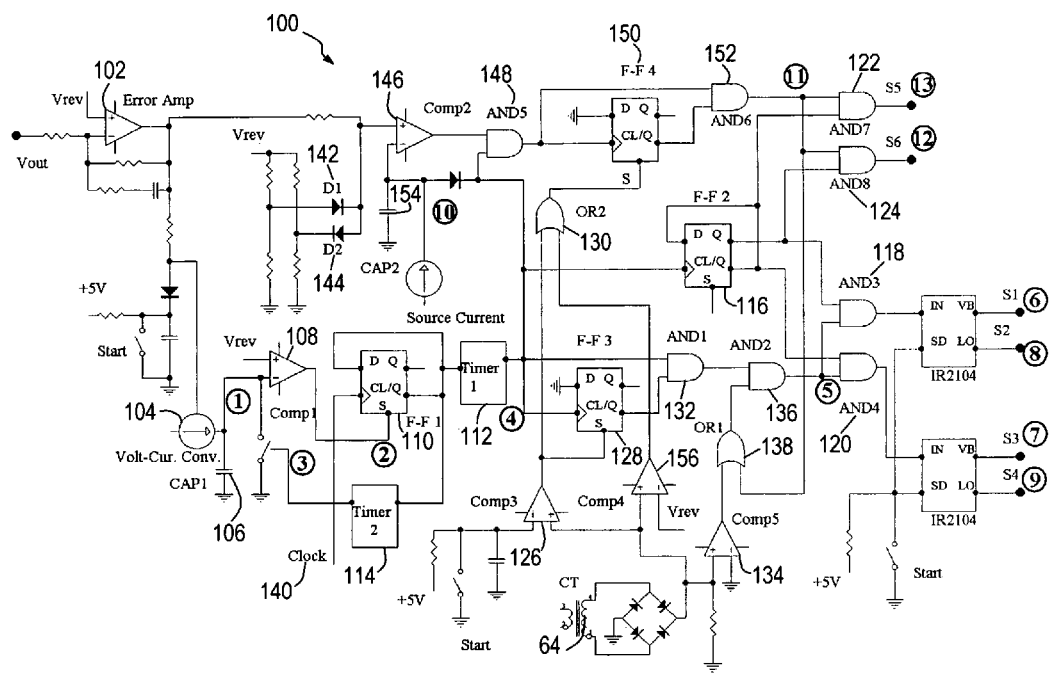
FIG. 3 shows a block diagram of a control system for a DC-DC converter according to an embodiment of the present invention.

FIG. 3 shows a block diagram of a control system 100 for control of converter power stage 10, depicted in the step-up mode. System 100 has two independent control loops that are interconnected by a synchronization pulse. A first control loop is for the control of the commutation frequency, while the second control loop controls PWM. A current transformer 64, shown in FIGS. 1 and 3, is used to provide feedback for control system 100.

With continued reference to FIG. 3, the frequency control loop consists of an error amplifier 102. The output of error amplifier 102 drives a voltage to a current converter 104 which, in turn, charges a capacitor 106. When the voltage of capacitor 106 reaches a predetermined voltage, Vrev, a comparator 108 produces a signal that releases a set pin for a first flip-flop 110. The first signal that arrives at a clock input of flip-flop 110 toggles its output. This signal triggers a first timer 112 and a second timer 114. Timer 114 discharges capacitor 106, while the output from timer 112 synchronizes the two control loops. The synchronization pulse also clocks a second flip-flop 116, which provides the separation of converter power stage 10 (FIG. 1) control pulse into even and odd through a group of AND gates 118, 120, 122 and 124. The duration of the pulse from Timer 112 preferably equals about half of the minimum commutation period, i.e., the maximum commutation frequency.

Figure 7:
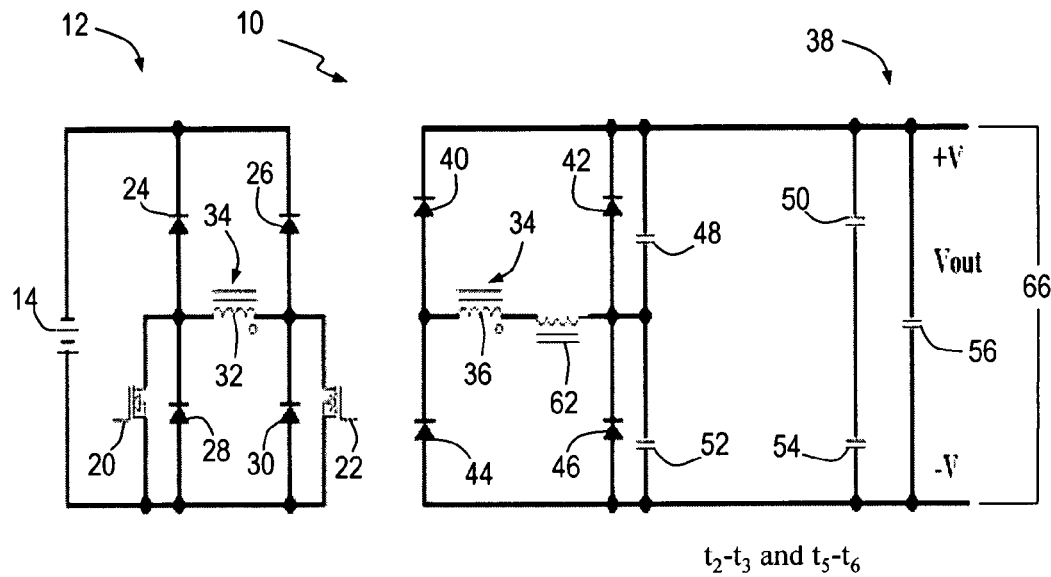
FIG. 7 shows a power stage mode corresponding to time $t_2$ to $t_3$ and $t_5$ to $t_6$ marked in FIG. 4.
Figure 8:
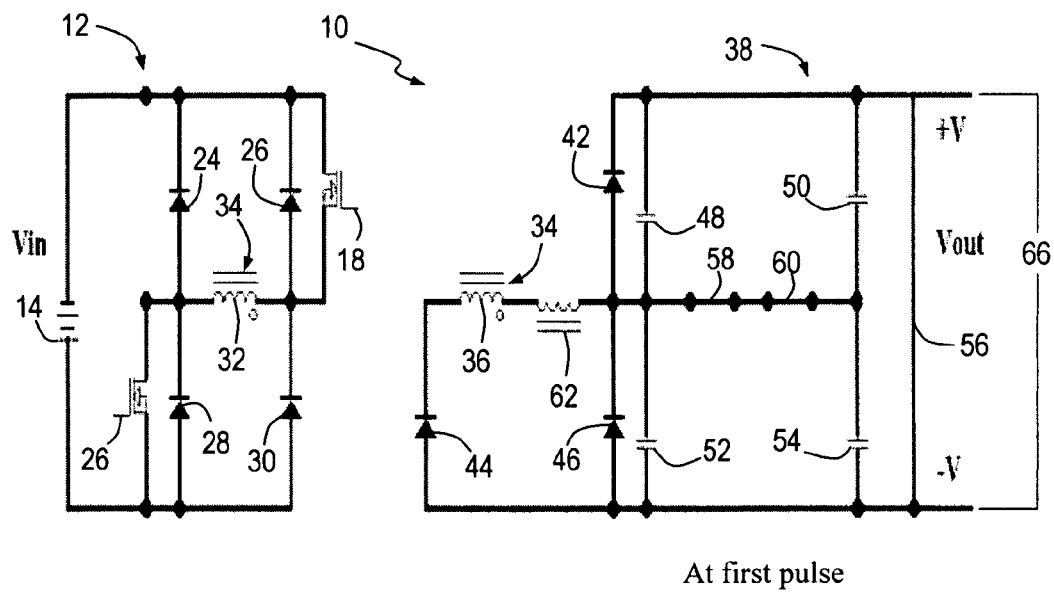
FIG. 8 shows a power stage mode corresponding to when the converter of FIG. 3 starts operating with a first pulse.

A comparator 126, a flip-flop 128, an OR gate 130 and an AND gate 132 are provided to reduce the duration of the power conversion cycle to reduce the peak current in the resonant circuit during initial ramp up, i.e., soft start of converter power stage 10. During startup the output capacitor 56 of converter power stage 10 is essentially a short circuit, as shown in FIG. 8. A comparator 134, along with an AND gate 136, and an OR gate 138 provide clamping of the primary side 12 of converter power stage 10 when there is zero current in converter secondary portion 14, as depicted in FIG. 7. The resolution of the amount of commutation frequency change depends upon a clock frequency provided by clock 140, which is preferably at least 4 times the maximum commutation frequency of converter power stage 10. The higher the clock frequency the finer the resolution of the commutation frequency changes for converter power stage 10. The ultimate commutation frequency change range preferably exceeds about 1000:1.

The PWM control loop includes a limiter of the maximum/minimum duty cycle of the PWM with a pair of diodes 142 and 144. The minimum limit allows the secondary circuit to function in a resonance mode at the beginning of the power conversion cycle. The maximum limit provides a higher average output current (and hence a lower RMS current) density during the conversion cycle when at high power. This is because the current drop to zero results from inductor 62 energy discharge rather than the resonance process, and thus occurs more quickly. The minimum duty cycle is preferably around 10%, and the maximum is preferably around 90%. Comparator 146 and AND gate 148 produce PWM pulses, synchronized by a pulse from timer 112 by a flip flop 150 and an AND gate 152, and terminated by the charging of a capacitor 154. A comparator 156, OR gate 130, flip-flop 150, and AND gate 152 provide a current limit for the resonant circuit.

Figure 4:
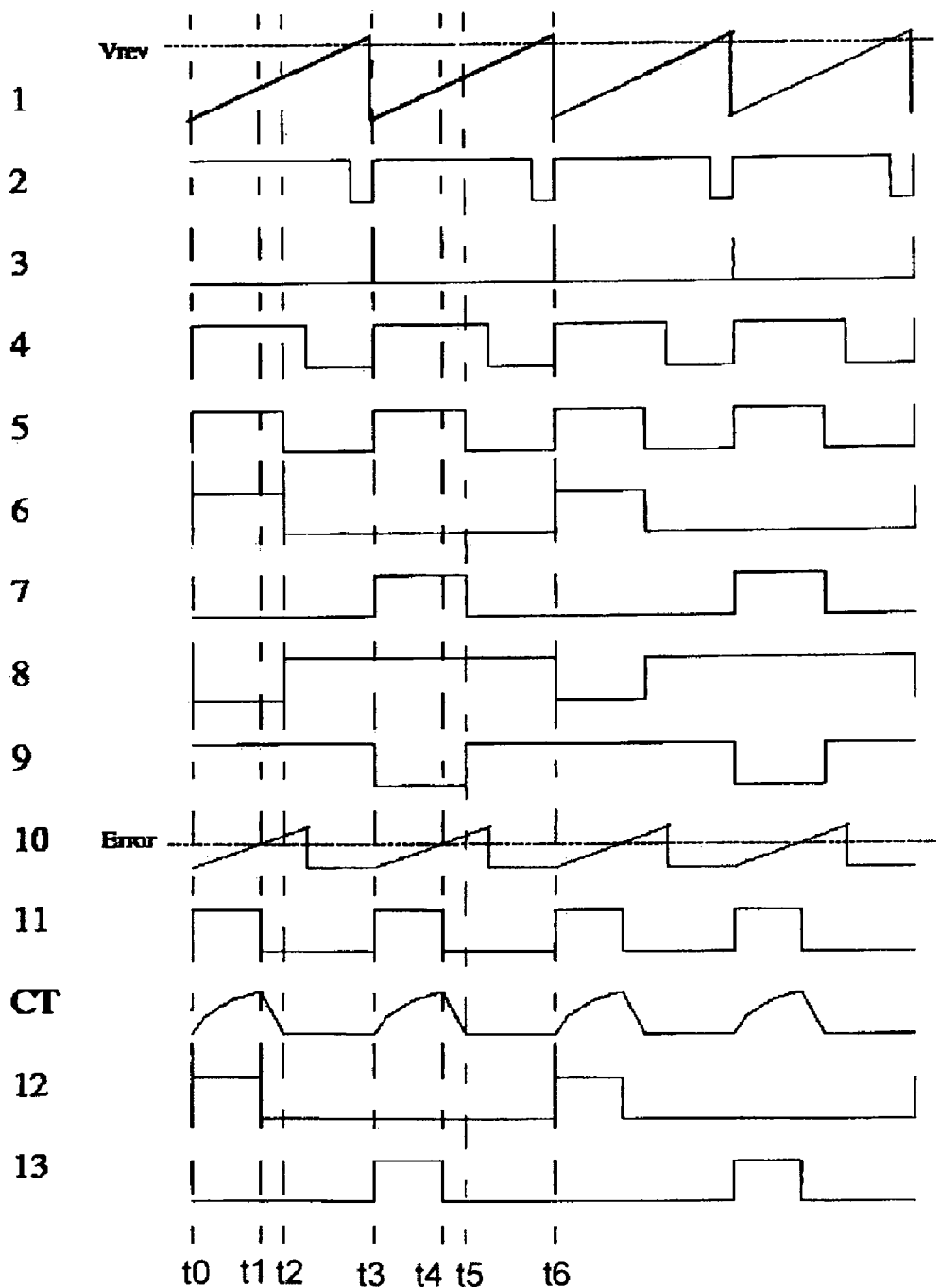
FIG. 4 presents waveforms of the control system of FIG. 3 at various points in the circuit when the converter is operating.
Figure 5:
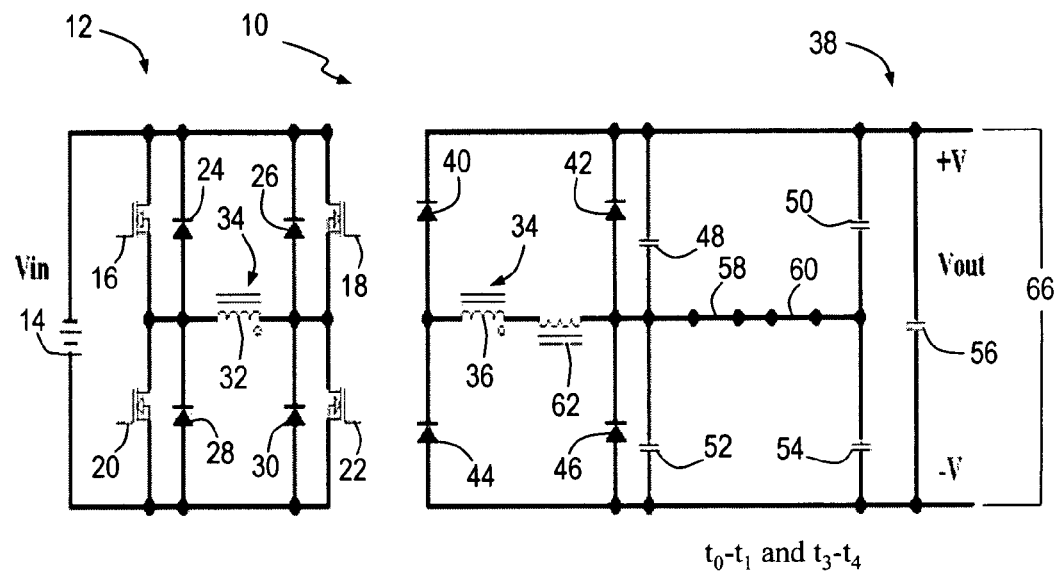
FIG. 5 shows a power stage mode corresponding to a time $t_0$ to $t_1$ and $t_3$ to $t_4$ marked in FIG. 4.
Figure 6:
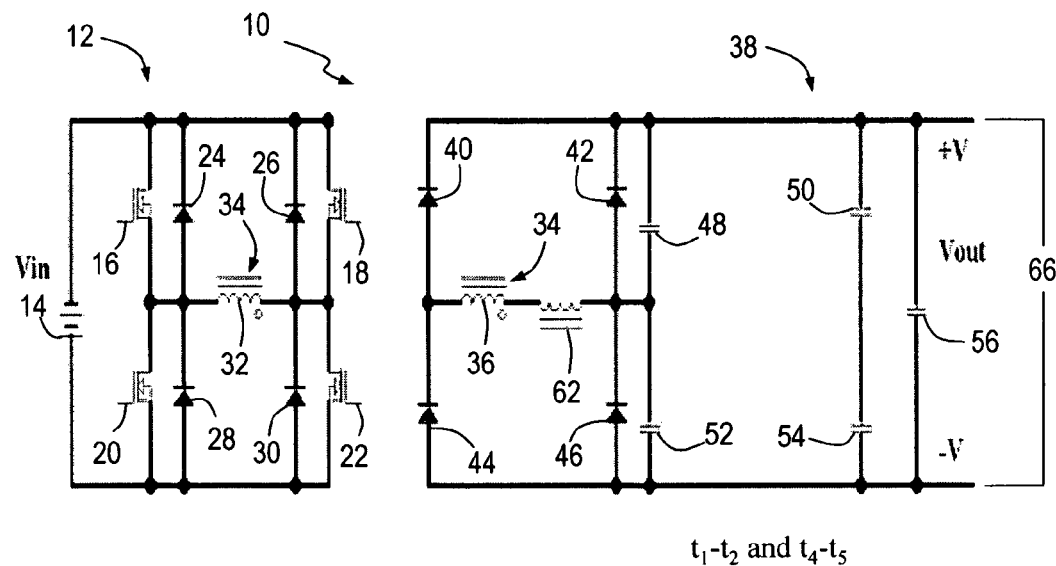
FIG. 6 shows a power stage mode corresponding to a time $t_1$ to $t_2$ and $t_4$ to $t_5$ marked in FIG. 4.

FIG. 4 presents waveforms present at various points in control system 100 (see FIG. 3) at an intermediate output level (i.e., before maximum commutation frequency is reached). FIGS. 5, 6, 7 and 8 each show converter power stage 10 corresponding to particular times "t" marked on FIG. 4.

In one embodiment the present invention may be an inverter-charger that converts solar energy to AC. The inverter-charger specification may be on the order of about 6 kW AC output, with a crest factor of about 5, a maximum commutation frequency of about 150 kHz, a power consumption of about 9-10 watts at idle, and a weak DC-link.

The present invention may be used in step-up topologies for high power application where the output voltage is greater than 200 VDC. The converter power stage 10, controlled by control system 100, is characterized by good regulation, rapid transient response, low component stress, high converter efficiency, low EMI emissions, and a relatively low cost as compared to other converters with similar performance metrics.

Figures 9, 10:
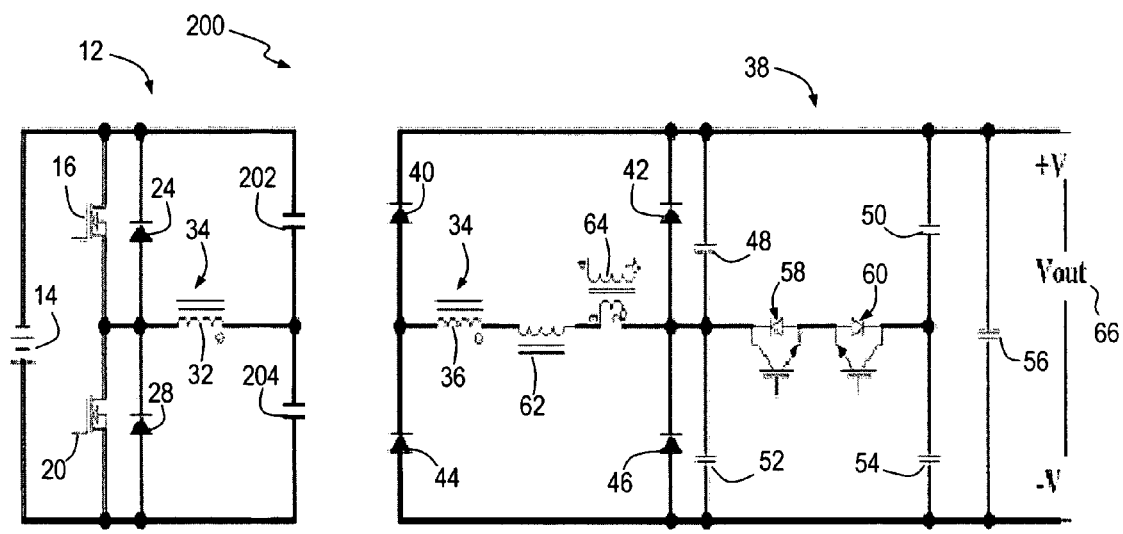
FIG. 9 is a table of example performance data for two DC-DC converters according to an embodiment of the present invention.
FIG. 10 is a schematic diagram of a DC-DC converter according to an embodiment of the present invention utilizing a half-bridge switching converter.

FIG. 9 is a table of example performance measurements for converters according to embodiments of the present invention, based on an output specifications ranging from about 2-6 kilowatts.

Although power stage 10 of FIG. 1 is described above utilizing a full-bridge converter on the low-voltage side, the present invention may be applied equally to a "half-bridge" or a "push-pull" configuration on the low-voltage side. This is because the application of the square wave voltage and commutation by the magnetizing current is not fundamentally changed by the differing topologies. Thus, while all four of switches 16, 18, 20, 22 in the full-bridge configuration are operated in a complementary fashion as described above, the half-bridge and the push-pull configurations each require only two complementary switches, as detailed below.

With reference to FIG. 10, a power stage 200 utilizing a half-bridge configuration is shown. In power stage 200, switch 18 and diode 26 of FIG. 1 are replaced by a capacitor 202. Likewise, switch 22 and diode 30 of FIG. 1 are replaced by a capacitor 204. Capacitors 202, 204 are each of a suitable capacitance value and voltage rating for power stage 200. In operation, about half of the potential of source voltage 14 is impressed upon primary 32 when either of switches 16, 20 is turned on. It should be noted that the half-bridge configuration power stage 200 requires a greater transformer 34 turns ratio between primary 32 and secondary 36 as compared to the full-bridge power stage 10 of FIG. 1 to achieve a voltage step-up comparable with that of the full-bridge configuration of the power stage. Operation of power stage 200 is the same as power stage 10 (FIG. 1) in all other respects.

Figure 11:
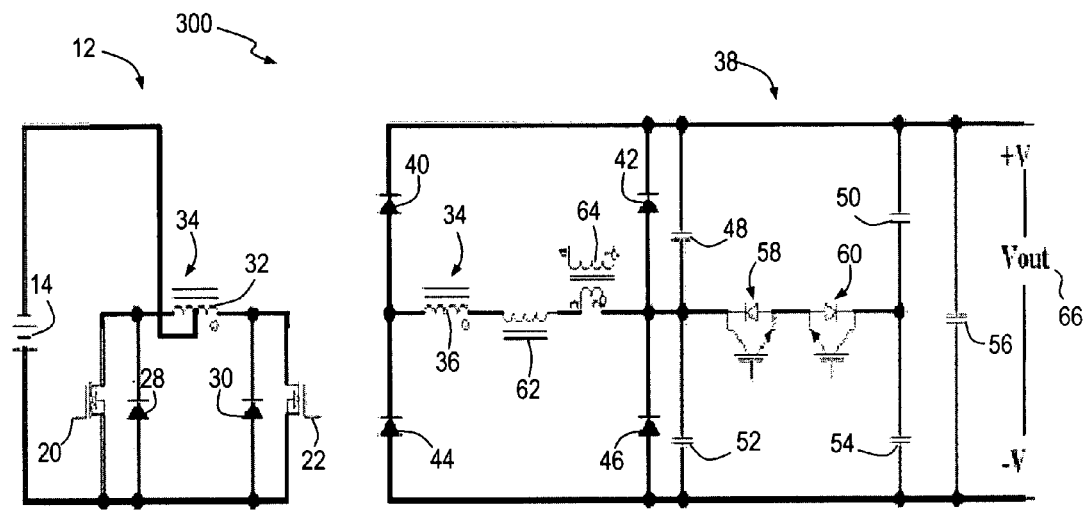
FIG. 11 is a schematic diagram of a DC-DC converter according to an embodiment of the present invention utilizing a push-pull switching converter.

With reference now to FIG. 11, a power stage 300 utilizing a push-pull configuration is shown. In this configuration primary 32 of transformer 34 is center tapped. The center tap is connected to a positive voltage of voltage source 14. Switches 16, 18 and diodes 24, 26 of FIG. 1 are removed. Switch 20 is actuated complementary to switch 22 to generate the magnetizing current in primary 32. Operation of power stage 300 is the same as power stage 10 (FIG. 1) in all other respects.

Figure 12:
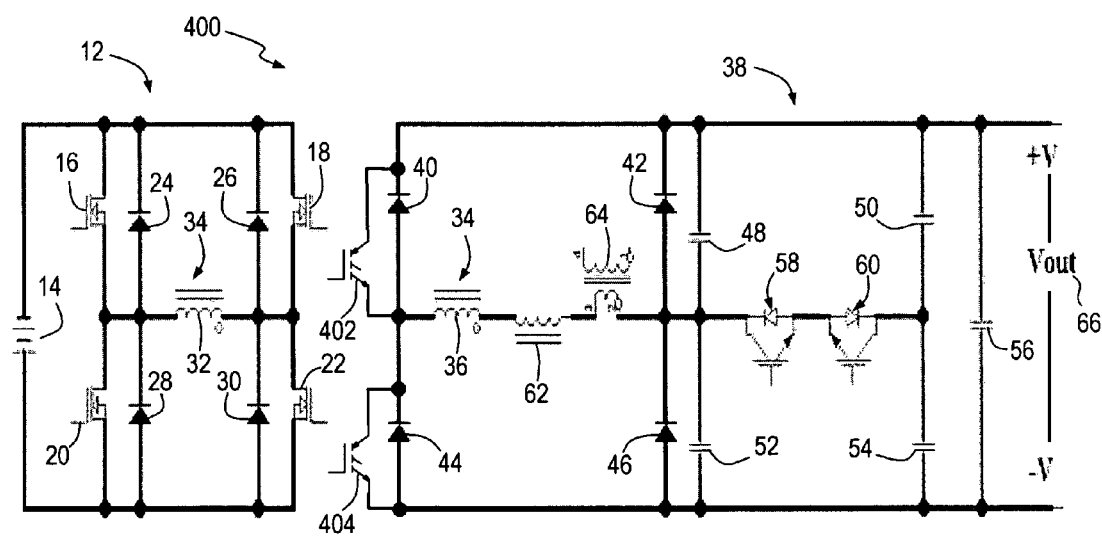
FIG. 12 is a schematic diagram of a bidirectional DC-DC converter according to an embodiment of the present invention.

Although the foregoing detailed description has focused on a voltage step-up conversion configuration it should be noted that the present invention can be readily adapted to voltage step-down conversion. Further, by combining step-up and step-down capabilities the present invention can function as a bidirectional voltage converter. For example, with reference to FIG. 12 a power stage 400 is depicted. Power stage 400 is similar to power stage 10 of FIG. 1, with the addition of a switch 402 connected in parallel with diode 40 and a switch 404 connected in parallel with diode 44. Switches 402, 404 may be any of the previously-discussed types of electronic switches including, but not limited, to an insulated gate bipolar transistor ("IGBT"). Switches 402, 404 may be actuated in a complementary fashion to drive winding 36 of transformer 34, inductor 62 and capacitors 48, 50, 52, and 54 in a resonant mode. In this way a voltage conversion can be performed, essentially driving transformer 34 in reverse. In this configuration the low voltage power devices 16, 18, 20, and 22 can be operated as synchronous rectifiers and diodes 24, 26, 28, and 30 will operate as conventional rectifiers. When operated in this manner input power from the high voltage side 38 is step-down converted to the low voltage side 12. Operation of power stage 400 is the same as power stage 10 (FIG. 1) in all other respects.

The present invention may be used to advantage to control various types of voltage converter and inverter topologies. A pertinent example is the inventors'"Alexander Topology" resonance energy conversion and inversion circuit, disclosed in U.S. Pat. No. 6,483,731, the contents of which are hereby incorporated by reference in its entirety.

While this invention has been shown and described with respect to a detailed embodiment thereof, it will be understood by those skilled in the art that changes in form and detail thereof may be made without departing from the scope of the claims of the invention.

What is claimed is:

1. A high-frequency DC-DC converter comprising:

a resonant power stage configured for variable frequency commutation control and for pulse width modulation duty cycle control; and a controller to operate the power stage such that the commutation frequency and the duty cycle of the power stage are both varied in response to the amount of load connected to an output of the converter when the power delivered to the load is less than a predetermined threshold level, and such that the commutation frequency of the power stage is substantially fixed and the duty cycle is varied in response to the amount of load when the power delivered to the load is greater than the predetermined threshold level, wherein the power stage is controlled by the controller to convert an input DC voltage to one of a higher output DC voltage and a lower output DC voltage.

2. The high-frequency DC-DC converter of claim 1 wherein the resonant power stage includes a primary portion comprising four electronic switches arranged as a full-bridge switching converter.

3. The high-frequency DC-DC converter of claim 1 wherein the resonant power stage includes a primary portion comprising four electronic switches arranged as a half-bridge switching converter.

4. The high-frequency DC-DC converter of claim 1 wherein the resonant power stage includes a primary portion comprising four electronic switches arranged as a push-pull switching converter.

5. The high-frequency DC-DC converter of claim 1 wherein the resonant power stage includes a secondary portion comprising four diodes arranged as a full-wave rectifier.

6. The high-frequency DC-DC converter of claim 1 wherein the resonant power stage includes at least two electronic switches to select at least one of the variable frequency mode and the pulse width modulation mode.

7. The high-frequency DC-DC converter of claim 1 wherein the resonant power stage is initially controlled at start-up by varying the frequency of the commutation of the resonant power stage, then controlling the commutation of the resonant power stage by pulse width modulation.

8. The high-frequency DC-DC converter of claim 1 wherein the resonant power stage is a unidirectional resonant converter.

9. The high-frequency DC-DC converter of claim 1 wherein the resonant power stage is a bidirectional resonant converter.

10. The high-frequency DC-DC converter of claim 1 wherein the resonant power stage includes at least one of zero current switching and zero voltage switching.

11. The high-frequency DC-DC converter of claim 1 wherein the resonant power stage comprises an Alexander Topology.

12. A high-frequency DC-DC converter comprising:
   a resonant power stage configured for variable frequency commutation control and for pulse width modulation duty cycle control, the power stage including a primary portion comprising four electronic switches arranged as a full-bridge switching converter and a secondary portion comprising four diodes arranged as a full-wave rectifier; and
   a controller to operate the power stage such that the commutation frequency and the duty cycle of the power stage are both varied in response to the amount of load connected to an output of the converter when the power delivered to the load is less than a predetermined threshold level, and such that the commutation frequency of the power stage is substantially fixed and the duty cycle is varied in response to the amount of load when the power delivered to the load is greater than the predetermined threshold level,
   wherein the resonant power stage is controlled by the controller to convert an input DC voltage to one of a higher output DC voltage and a lower output DC voltage.

13. A method for converting low-voltage DC to high-voltage DC comprising the steps of:
   operating a power stage in resonance, the power stage being configured for variable frequency commutation control and for pulse width modulation duty cycle control; and
   controlling the power stage such that the commutation frequency and the duty cycle of the power stage are both varied in response to the amount of load connected to an output of the converter when the power delivered to the load is less than a predetermined threshold level, and such that the commutation frequency of the power stage is substantially fixed and the duty cycle is varied in response to the amount of load when the power delivered to the load is greater than the predetermined threshold level, to convert an input DC voltage to one of a higher output DC voltage and a lower output DC voltage.

14. The method of claim 13, further including the step of initially varying the frequency of the commutation of the power stage at start-up, then controlling the commutation of the power stage by pulse width modulation.

15. The method of claim 13, further including the step of operating the resonant power stage as a unidirectional resonant converter.

16. The method of claim 13, further including the step of operating the resonant power stage as a bidirectional resonant converter.

17. The method of claim 13, further including the step of operating the resonant power stage with at least one of zero current switching and zero voltage switching.

18. The method of claim 13, further including the step of operating the resonant power stage as a full-bridge switching converter.

19. The method of claim 13, further including the step of operating the resonant power stage as a half-bridge switching converter.

20. The method of claim 13, further including the step of operating the resonant power stage as a push-pull switching converter.

* * * * *

UNITED STATES PATENT AND TRADEMARK OFFICE
CERTIFICATE OF CORRECTION

| | | |
|---|---|---|
| PATENT NO. | : 7,379,309 B2 | Page 1 of 1 |
| APPLICATION NO. | : 11/035839 | |
| DATED | : May 27, 2008 | |
| INVENTOR(S) | : Alexander Isurin and Alexander Cook | |

It is certified that error appears in the above-identified patent and that said Letters Patent is hereby corrected as shown below:

Column 3, line 43, replace "staffs" with --starts--; line 56, replace "import ant" with --important--; line 60, replace "staff'" with --start"--.

Column 4, line 4, replace "10'" with --10--.

Signed and Sealed this

Twenty-ninth Day of July, 2008

JON W. DUDAS
*Director of the United States Patent and Trademark Office*